(12) United States Patent
Alston

(10) Patent No.: US 10,309,662 B2
(45) Date of Patent: *Jun. 4, 2019

(54) ENVIRONMENT CONTROL SYSTEM AND DEVICES

(71) Applicant: Alaska Structures, Inc., Kirkland, WA (US)

(72) Inventor: Gerald A. Alston, Oakland, CA (US)

(73) Assignee: Alaska Structures, Inc., Kirkland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/467,009

(22) Filed: Mar. 23, 2017

(65) Prior Publication Data

US 2017/0191678 A1  Jul. 6, 2017

Related U.S. Application Data

(63) Continuation of application No. 14/030,249, filed on Sep. 18, 2013, now Pat. No. 9,638,434.

(51) Int. Cl.

| F24F 1/02 | (2019.01) |
| F25B 49/02 | (2006.01) |
| F24F 13/02 | (2006.01) |
| F24F 5/00 | (2006.01) |
| F24F 11/30 | (2018.01) |

(Continued)

(52) U.S. Cl.

CPC .............. *F24F 1/025* (2013.01); *F24F 5/001* (2013.01); *F24F 11/30* (2018.01); *F24F 11/77* (2018.01); *F24F 11/83* (2018.01); *F24F 13/0218* (2013.01); *F24F 13/0263* (2013.01); *F25B 49/02* (2013.01); *F24F 11/63* (2018.01); *F24F 11/84* (2018.01); *F24F 11/85* (2018.01); *F24F 2011/0002* (2013.01); *F24F 2110/10* (2018.01); *F24F 2110/20* (2018.01); *F24F 2110/50* (2018.01); *F24F 2140/60* (2018.01); *F24F 2221/34* (2013.01); *F25B 2600/0253* (2013.01); *F25B 2600/111* (2013.01); *F25B 2600/112* (2013.01); *F25B 2600/2513* (2013.01); *F25B 2700/151* (2013.01); *F25B 2700/171* (2013.01); *F25B 2700/172* (2013.01); *F25B 2700/173* (2013.01); *F25B 2700/1931* (2013.01); *F25B 2700/1933* (2013.01); *F25B 2700/21161* (2013.01); *F25B 2700/21173* (2013.01);

(Continued)

(58) Field of Classification Search

None

See application file for complete search history.

(56) References Cited

U.S. PATENT DOCUMENTS

| 4,018,266 A | * | 4/1977 | Kay | .......................... F24F 1/02 165/237 |
| 4,798,057 A | * | 1/1989 | Okamoto | .............. F25B 49/025 62/209 |

(Continued)

*Primary Examiner* — Jason Lin
(74) *Attorney, Agent, or Firm* — Blank Rome LLP

(57) ABSTRACT

Heating, ventilating and air conditioning are provided to a temporary, flexible shelter, especially in a rugged, remote and/or extreme environment, including locations and/or conditions where access to electric power may be limited and/or expensive. A portable system may include a light weight HVAC unit, with variable-speed components that are dynamically managed for efficiency, reliability and safety, and a flexible, self-insulating duct for connecting the HVAC unit to the temporary shelter.

6 Claims, 8 Drawing Sheets

(51) Int. Cl.
  F24F 11/77 (2018.01)
  F24F 11/83 (2018.01)
  F24F 11/00 (2018.01)
  F24F 110/10 (2018.01)
  F24F 110/20 (2018.01)
  F24F 110/50 (2018.01)
  F24F 140/60 (2018.01)
  F24F 11/63 (2018.01)
  F24F 11/84 (2018.01)
  F24F 11/85 (2018.01)

(52) U.S. Cl.
  CPC ............ *Y02B 30/741* (2013.01); *Y02B 30/743* (2013.01); *Y02B 30/746* (2013.01); *Y02B 30/78* (2013.01)

(56) References Cited

U.S. PATENT DOCUMENTS

| | | | |
|---|---|---|---|
| 5,777,897 A * | 7/1998 | Giorgio | ................... F24F 11/77 700/299 |
| 6,609,967 B2 | 8/2003 | Sharp | |
| 6,672,085 B1 | 1/2004 | Sangwan | |
| 7,735,502 B1 | 6/2010 | Hotes | |
| 2003/0061827 A1* | 4/2003 | Sakakibara | ............. F25B 9/008 62/224 |
| 2003/0121271 A1 | 7/2003 | Dinnage | |
| 2004/0045308 A1 | 3/2004 | Field | |
| 2004/0099747 A1 | 5/2004 | Johnson | |
| 2005/0156052 A1* | 7/2005 | Bartlett | ................ F24F 11/0001 236/49.3 |
| 2005/0235666 A1 | 10/2005 | Springer | |
| 2008/0245083 A1* | 10/2008 | Tutunoglu | ............ F25B 49/005 62/115 |
| 2008/0311842 A1 | 12/2008 | Alston et al. | |
| 2009/0228149 A1 | 9/2009 | Alston | |
| 2009/0236432 A1 | 9/2009 | Malloy | |
| 2010/0269526 A1* | 10/2010 | Pendergrass | ......... F24F 11/0008 62/186 |
| 2011/0067420 A1 | 3/2011 | Alston | |
| 2012/0035769 A1* | 2/2012 | Lin | ....................... G05B 11/28 700/275 |
| 2012/0191253 A1 | 7/2012 | Rockenfeller et al. | |
| 2012/0253543 A1* | 10/2012 | Laughman | ............. F25B 49/02 700/300 |
| 2012/0318014 A1* | 12/2012 | Huff | ......................... F25B 1/10 62/228.1 |

* cited by examiner

ENVIRONMENT CONTROL SYSTEM AND DEVICES

This is a continuation of U.S. patent application Ser. No. 14/030,249, filed Sep. 18, 2013, the entire disclosure of which is incorporated herein by reference in its entirety.

The present disclosure relates to a system and devices for providing heating, ventilating and air conditioning to a temporary, flexible shelter, especially in a rugged, remote and/or extreme environment, including locations and/or conditions where access to electric power may be limited and/or expensive. The system may include a light weight HVAC unit, with variable-speed components that are managed for efficiency, reliability and safety, and a flexible, self-insulating duct for connecting the HVAC unit to the temporary shelter.

BACKGROUND

U.S. Pat. No. 7,735,502 (Hotes) illustrates a heating, ventilating and air conditioning unit for a temporary flexible shelter.

U.S. Pre-Grant Publication 2009/0228149 (Alston '149) refers to an environment control and power system for a temporary hospital or first-aid shelter operated by military or other emergency response services. The Alston system is said to have a variable speed compressor, and the respective compressor and blower speeds are said to be automatically set. Alston also refers to an electric resistance heater, and a user interface, which is said to control humidity.

U.S. Pre-Grant Publication 2008/0311842 (Alston '842) refers to a forced-air heating, ventilating and air conditioning system that routes air, through a diverter Y valve, to different locations, based on sensed conditions, including temperature and hazardous conditions, or under the control of a user interface.

U.S. Pre-Grant Publication 2012/0191253 (Rockenfeller) refers to a heating, ventilation, air conditioning, and refrigeration system for a residential home, commercial building or remote location. Rockenfeller refers to variable frequency drives for controlling the speeds of a blower and a compressor motor.

The known systems are not sufficiently light weight, efficient, rugged and reliable, and safe, especially for use in remote, extreme environments. There is a need in the art for an HVAC unit that is better suited for operations where the unit has to be moved and installed by hand, where fuel for generating electric power is scarce and expensive, where weather conditions include very high and low temperatures, rapid, large changes in temperature, and high humidity, and/or where rapid set-up, reliability, and safe performance are at a premium.

SUMMARY

The disadvantages and shortcomings of the known systems, devices and processes are overcome to a great extent by the present disclosure, which relates to a portable environment control system for use with one or more portable, semi-permanent or permanent shelters, including fabric shelters and tents. The control system has a refrigerating circuit with an air-cooled refrigerant condenser, a refrigerant-air heat-exchanging evaporator, an expansion valve, and a refrigerant compressor operated by a variable-speed electric motor. Outside air may be circulated over the condenser by a fan that is driven by a variable-speed electric motor, and recycled air may be circulated over the evaporator by a fan that is driven by its own variable-speed electric motor. The refrigerating circuit, which contains a suitable refrigerant gas, may be at least partially contained within a hermetically sealed enclosure, to protect the system from weather, including ultraviolet radiation, wind, rain and snow. The environment control unit may have an electric-resistance heating element in the path of the air that flows over or through the evaporator, for providing heated air when it is cold outside.

According to a preferred embodiment, the environment control system of the present disclosure has a user interface, a plurality of sensors, and an intelligent (programmed with software and/or firmware, and/or hard-wired) management system. The interface may be used by an operator to input and receive information, including operational information, diagnostic codes, present system settings, and user adjustment controls. The sensors may include temperature sensors, pressure sensors, and an air quality sensor. The temperature sensors may be used to monitor the temperature of the inlet air to the condenser, the temperature of the inlet air to the evaporator, and the temperature of the discharge air from the evaporator. The pressure sensors may be configured to monitor the high-side refrigerant pressure (Pd) and the low-side refrigerant pressure (Ps) (i.e., the pressures of the refrigerant immediately upstream and downstream from the compressor).

As discussed in more detail below, the intelligent management system may contain information on safe operating limits of various system components, and may be configured to receive additional (input) information from internal and external sensors. In operation, the management system may continuously (or when prompted to do so) adjust one or more of the speed of the condenser fan, the speed of the evaporator fan, and the speed of the compressor, to maintain the best possible operating performance without exceeding the operating limits of the compressor (or other sensitive system components).

The compressor, with its associated variable-speed motor, may be the heaviest component, or one of the heaviest components, of the environment control system. Thus, an object of the present disclosure is to configure the environment control system so that it can perform as needed even with a compressor that is relatively light weight. Reducing the weight of the compressor makes the HVAC unit easier to transport and install; reducing the weight of the compressor may be especially important where the HVAC unit is transported and/or installed by hand. Reducing the weight of the compressor is also important for units that may have to be transported rapidly, for example by helicopter, over large distances or over rugged terrain or in other difficult conditions. At the same time, the environment control system is proactively and dynamically managed so that the relatively small compressor (which has more constrained operating limits than would be the case for a larger compressor) is reliably maintained within its safe operating limits, while the system continues to meet performance requirements with respect to air temperature, relative humidity, air quality, and safety, to the extent possible.

According to the present disclosure, the refrigerant gas may have a low critical temperature and/or a low critical pressure. The refrigerant gas may be, for example, an R-410A refrigerant, including but not limited to ones marketed under the brand names Forane 410A, Puron, EcoFluor R410, Genetron R410A, and AZ-20. In operation, the intelligent management system adjusts one or more operational parameters, including condenser fan speed, evaporator fan speed, and compressor speed, to ensure that the system operates below the critical temperature and/or pressure.

According to the present disclosure; the critical temperature and/or pressure is incorporated into the algorithm that is run in real time by the management system, and is used by the management system to ensure that the temperature and/or pressure of the refrigerant gas does not exceed safe and desirable limits. Further, the management system may be configured to dynamically adjust the evaporator superheat, by adjusting the extent to which the expansion valve is open, to maintain the compressor inlet and/or discharge gas temperatures within predetermined safe operational limits. If desired, the expansion valve for the refrigerant circuit may be electronically, remotely adjustable.

According to other aspects of the present disclosure, the evaporator fan motor, the condenser fan motor, and the compressor motor are permanent magnet motors. The intelligent management system may be configured to restrict the maximum acceleration rate of the variable-speed motors to prevent current draw through the components from exceeding predetermined maximum safe levels. In addition, the maximum deceleration rate of the permanent magnet motors may be restricted to prevent the buildup of excessive voltage.

In addition, the management system may be configured, if desired, to restrict the maximum acceleration rate of the compressor motor to prevent temporary loss of compressor lubrication. According to one aspect of the present disclosure, as part of a compressor startup sequence, the compressor motor may be held at a predetermined speed for a predetermined period of time to ensure that the compressor has proper lubrication. After an initial period of time, during which pressure equalization occurs, the speed of the compressor motor may be linearly increased and then held at a constant predetermined speed for a hold period sufficient to avoid loss of lubrication during compressor start-up, after which the compressor may be operated at target speeds according to performance requirements, as determined by the intelligent management system.

According to another aspect of the present disclosure, the environment control system may have an electronically controllable/adjustable fresh air vent. The vent may be electronically moved to a fully-closed position, a fully-open position and to positions between the fully-open and fully-closed positions. An air quality sensor may be located within the air stream that is circulated by the evaporator fan. The air quality sensor may be used to monitor the circulating air to determine the presence and/or concentration level of one or more contaminants, including carbon dioxide.

According to another aspect of the present disclosure, the environment control system may be operated in two modes, that is, a first, adjustable-vent mode and a second, closed-vent mode. The first mode is an active mode in which the position of the fresh air vent (the extent to which the vent is open) is adjusted to prevent the level of contamination within the circulating air from exceeding a first predefined maximum. The second mode is an inactive mode in which the fresh air vent remains fully closed regardless of the level of contamination. Whether the environment control system is operated in the first or second mode may be user selectable.

According to another aspect of the present disclosure, the environment control system may be operated in a third mode, wherein, when the user-selectable mode of fresh air vent operation is active, the rotational speed of the compressor is monitored by the intelligent management system and, upon the compressor speed exceeding a predefined threshold, the predefined maximum level of contamination within the circulating air is increased from the first level to a second, higher predefined maximum level. This way, a balance is achieved between the amount of contamination that is accepted in the conditioned air and the need to keep the compressor operating without failure or damage.

According to another aspect of the present disclosure, the environment control system may have a relative humidity sensor located in the return air stream ahead of the evaporator. The intelligent management system may respond to one or more signals from the relative humidity sensor to adjust the compressor speed to increase or decrease the amount of dehumidification of the return air by modifying the target evaporator temperature.

In a preferred embodiment, the internal components of the environment control system, including the variable-speed compressor, the fans, and the electric resistance heater, operate entirely on direct current (DC). The environment control system may be connected directly to a source of DC electric power or to a source of alternating-current (AC) electric power. The power source may be, for example, a diesel generator, or a wind or solar power device or system. The environment control system may be configured such that any AC electric power that is input to the environment control system is immediately converted to DC electric power. A user-accessible switch may be used to set a maximum total operating power consumption to one of a plurality of levels, for example, by setting one or more of the maximum current draw of the variable-speed compressor, the maximum rotational speed of the variable-speed evaporator fan, and the maximum phase-width modulation (PWM) duty cycle of the electric resistance heater. If desired, the intelligent management system can be configured to automatically limit the maximum current draw and rotational speed of various components so that the devices can be safely and continuously operated at input power voltages that are within at least 20% above and 30% below their nominal operating voltages.

If desired, the environment control system may have an exterior enclosure having sufficient rigidity to safely and securely support the weight of at least three such HVAC units stacked vertically on top of each other. Each unit may be provided with pockets for accepting the forks of an industrial lift truck, and one or more concave and/or convex pockets may be located at the top and the bottom to aid in centering the units during stacking. If desired, the system may be safely secured to a vertically-stacked second system for storage and/or transport.

The present disclosure also relates to a flexible duct for conveying the air discharged from the evaporator into the portable shelter, which may be a tent, or some other enclosure with flexible walls. The shelter may be configured to shield medical personnel and patients from weather, dust, and other adverse environmental conditions. Alternatively, the shelter may be configured to protect stored items, such as food, equipment or other supplies, from weather, dust, and other adverse environmental conditions.

The flexible duct may be inflated by the pressure of the air discharged by the HVAC unit. The duct may have an outer wall that is formed of a lightweight, gas impermeable membrane. According to one aspect of the present disclosure, the duct may have both an inner wall and an outer wall. The inner wall may have limited porosity to permit air inside the duct to pass to the annulus between the inner and outer walls. Baffles may be located within the annulus to prevent the air that has entered it from actively circulating. As a result, the air within the annulus becomes stagnant and provides thermal insulation between the air flowing through the duct (contained within the inner wall) and the environment outside the outer wall.

Thus, the environment control system may include a heating, ventilating and air conditioning (HVAC) unit for use with a portable shelter in a rugged environment. The outside environment may be characterized by extreme high-temperature conditions and limited access to fuel for generating electric power. The HVAC unit may be configured to limit one or more of the maximum load of the compressor motor, the maximum temperature of the compressor motor stator windings, the maximum suction gas return temperature, the maximum compressor discharge temperature, and the gas-compression ratio generated by the compressor.

According to another aspect of the present disclosure, the HVAC unit may have an intelligent management system that selectively operates the unit in a standard mode and a protective mode. The standard mode may be selected where external (environmental) conditions are such that the maximum operating temperature and/or pressure of any one or more system components will likely not be exceeded. The system may be configured to automatically switch to the protective mode of operation where the external conditions are such that one or more system components likely would exceed a design specification (i.e., a safe limit) if the system were operated in the standard mode.

According to other aspects of the present disclosure, the HVAC unit may be configured to automatically switch from the standard mode to the protective mode based on the temperature of the condenser inlet air, the evaporator inlet air, or both. Moreover, the HVAC unit may be configured to switch from the standard operating mode to the protective operating mode based on one or more of the system low-side pressure, the system high-side pressure, the compressor current draw, the compressor rotational speed, the evaporator fan rotational speed, and the condenser fan rotational speed.

Thus, the intelligent management system may reduce the speed of the compressor when operating in the protective mode to a level below the speed that would otherwise be set if the HVAC unit were operating in the standard mode. Likewise, the speed of the condenser fan may be increased in the protective mode to a level above the speed that would be set if the HVAC unit were operating in the standard mode, and the speed of the evaporator fan may be set in the protective mode to a level below the speed to which it would be set if the HVAC unit were in the standard mode.

According to a preferred embodiment, the heating, ventilating and air conditioning system, employing the intelligent management system, may set the compressor rotational speed as the speed necessary to achieve a predefined target evaporation temperature when operating in the standard mode. The management system likewise may be configured to measure the power consumption of the compressor and the power consumption of the condenser fan, and to adjust the speed of the condenser fan to provide the lowest total power consumption, when operating in the standard mode.

According to another aspect of the present disclosure, the intelligent management system may set the target speed for the evaporator fan via a proportional, integral, derivative (PID) feedback control algorithm based on the difference between the desired temperature of the space being conditioned (i.e., the space within the shelter) and the temperature of the return air (i.e., the air that is returned to the evaporator).

If desired, a sunlight-readable user interface panel may be permanently affixed to the HVAC unit and used to control the system, and to display operational data. According to another aspect of the present disclosure, a detachable, remote user-interface may allow a user/operator to fully or partially control the system even when the user/operator is located more than five feet away from the environment control system. A dual-function data transfer port may allow a computer to transfer data to and from the remote user interface for operator-system control across a distance of more than five feet. If desired, the environment control system may be operated by a person who is located and protected from the outside elements within the fabric shelter.

DETAILED DESCRIPTION

Figure 1:
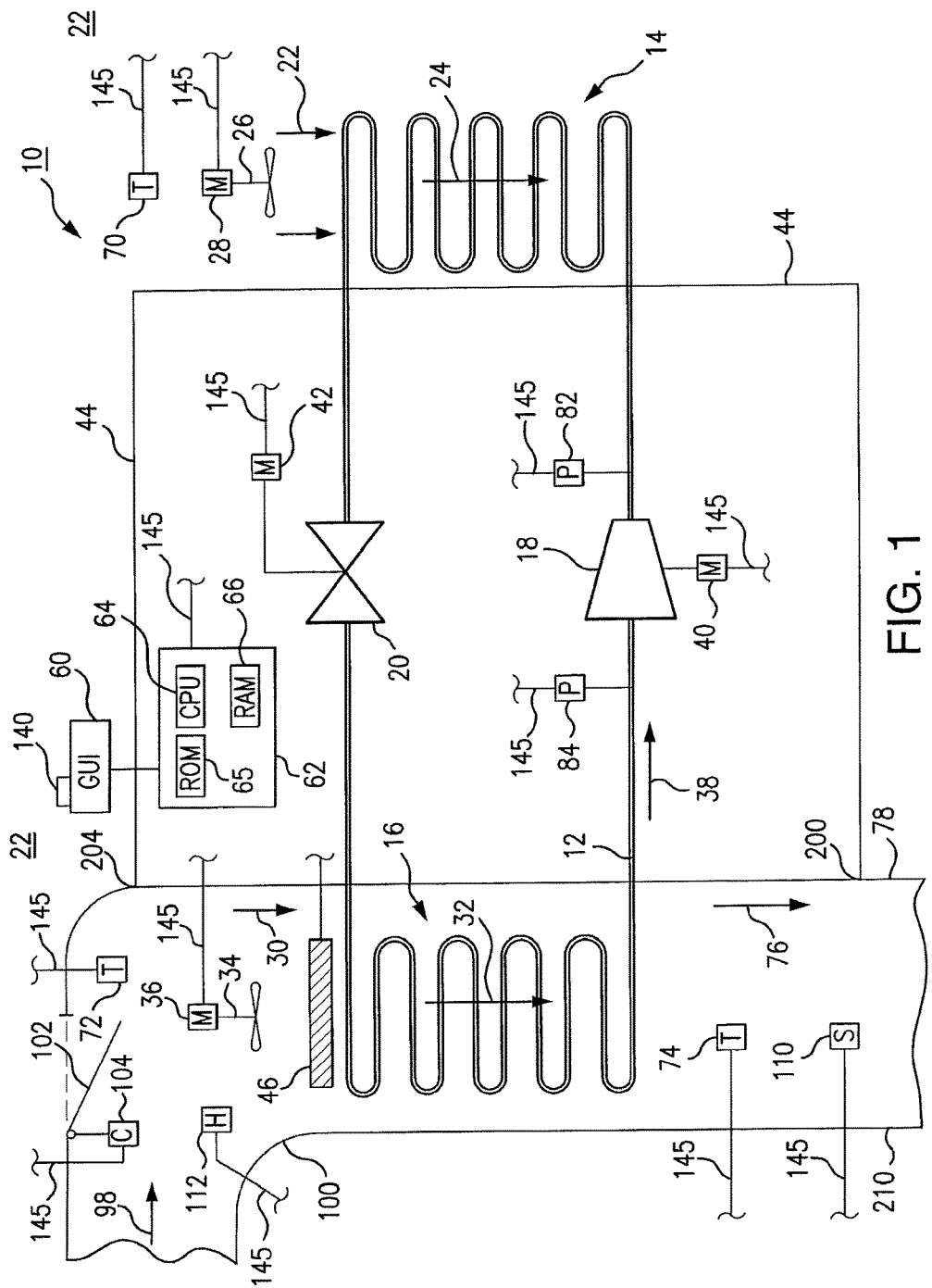
FIG. 1 is a schematic view of an environment control system constructed in accordance with the present disclosure.

Referring now to the drawings, where like elements are designated by like reference numerals, there is shown in FIG. 1 an environment control system 10 constructed in accordance with a preferred embodiment of the present disclosure. The system 10 has a refrigerating circuit 12 which includes an air-cooled refrigerant condenser 14, a refrigerant-air heat-exchanging evaporator 16, a relatively small, variable-speed refrigerant compressor 18, and an expansion valve 20. Incoming air 22 is circulated over the condenser 14 in the direction of arrow 24 by a fan 26 that is driven by a variable-speed electric motor 28.

Recycling air 30 is circulated over the evaporator 16, in the direction of arrow 32, by a fan 34 that is driven by a variable-speed electric motor 36. The refrigerant compressor 18 causes a suitable refrigerant gas to flow through the circuit 12 in the direction of arrow 38, and is driven by a variable-speed electric motor 40. The expansion valve 20 is variably controlled/adjusted by a suitable controller 42. The enclosed parts 18, 20, 16 of the refrigerant circuit 12 are protected from the weather by an enclosure 44. The condenser 14 is located functionally outside of the enclosure 44, to transfer heat to the ambient outside air 22.

An electric-resistance heating element 46 is located in the path of the recycling air 30 that flows over the evaporator 16.

The heating element 46 is used to provide heat for the flexible shelter 80 (FIG. 2) when the shelter 80 is located in a cold environment.

The system 10 has a plurality of sensors for providing operational information to a user interface 60 (FIG. 1), and to an intelligent management system 62 contained within the enclosure 44. The management system 62 may have a computer processor 64, a main data-storage memory device 65, and a working data-storage memory device 66, each of which may be encoded with software and/or provided with hardware to implement the functions of the intelligent management system 62 described herein. The management system 62 has suitable signal wires, receivers or transmitters 145 for communicating with other components of the system 10 via signal wires, receivers or transmitters 145 of those components. Although FIG. 1 shows the management system 62 within the enclosure 44, the management system 62 may be located outside of the enclosure 44 and remote from the other parts of the environment control system 10. In addition, the processor 62 may be in the form of, or supplemented by, one or more processors, distributed processors, and/or a cloud computing environment.

A first temperature sensor 70 is used to monitor the temperature of the inlet air 22 upstream from the condenser 14 (the inlet air 22 is the outside air 22 that is located outside of the HVAC enclosure 44). A second temperature sensor 72 is used to measure the temperature of the inlet air 30 upstream from the evaporator 16. The heating element 46 may be located between the second temperature sensor 72 and the evaporator 16. A third temperature sensor 74 is located at the downstream, discharge end of the evaporator 16. The third temperature sensor 74 is used to measure the temperature of the conditioned (or heated) air 76 that is forced into a flexible duct 78 to flow into the shelter 80.

A first pressure sensor 82 is used to monitor the high-side refrigerant pressure (Pd), downstream from the compressor 18, and a second pressure sensor 84 is provided to monitor the low-side refrigerant pressure (Ps), upstream from the compressor 18.

The intelligent management system 62 may contain (or be loaded with) information on safe operating limits of the various system components 28, 20, 36, 18, and the system 62 may be configured to receive additional (input) information from internal and external sensors 72, 70, 74, 84, 82. In operation, the management system 62 continuously adjusts one or more of the speed of the condenser fan motor 28, the speed of the evaporator fan motor 36, and the speed of the compressor 18, to maintain optimum HVAC performance without exceeding the operating limits of the sensitive system components, especially the limits of the small compressor 18.

Figure 3:
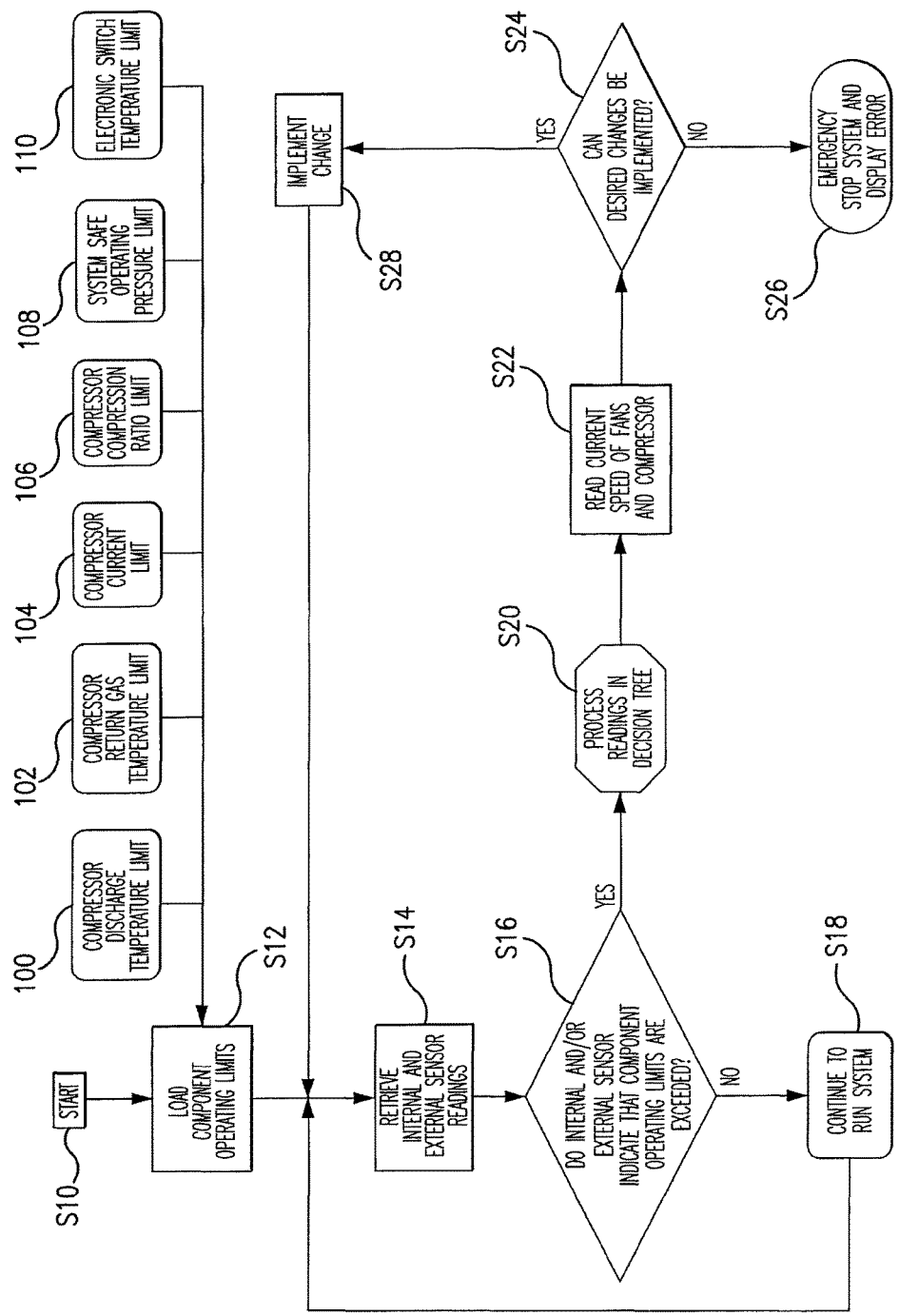
FIG. 3 is a flow chart for a process of operating the environment control system of FIG. 1, which takes into consideration whether component operating limits are exceeded.

As illustrated in FIG. 3, following start of operations (S10), the processor 64 loads component operating limits into the working memory device 66 (S12). The operating limits include a compressor discharge temperature limit 100, corresponding to the first pressure monitor 82, a compressor return gas temperature limit 102, corresponding to the second pressure monitor 84, a current limit 104 for the compressor motor 40, a compression ratio limit 106, corresponding to a relationship between pressures measured by the first and second pressure monitors 82, 84, a system safe operating pressure limit 108, and an electronic switch temperature limit 110. If the system 10 is determined to exceed either the system safe operating pressure limit 108 or the electronic switch temperature limit 110, the system 10 is automatically shut down and stops operating.

The processor 64 then reads one or more internal and external sensor readings from the sensors 72, 70, 74, 84, 82 (S14), and then the processor 64 determines whether the sensor readings indicate that component operating limits 100, 102, 104, 106, 108, 110 are exceeded (S16). If NO, then the processor 64 causes the system 10 to continue to run (S18), and the process returns to Step S14. If YES (i.e., if the sensor readings indicate that one or more component operating limits 100, 102, 104, 106, 108, 110 are exceeded), then the processor 64 begins to process readings according to a decision tree (S20), as discussed in more detail below.

In operation, the management system 62 reads the speeds of the fans 26, 34 and the compressor 18 (S22), and the processor 64 determines whether one or more of the speeds can be changed in a way that would prevent the component operating limits 100, 102, 104, 106, 108, 110 from being exceeded (S24). If NO, the processor 64 causes the system 10 to stop on an emergency basis, and causes the display unit 60 to display an error message (S26). If YES (i.e., if a determination is made that a desired change can be implemented), then the change is implemented (as discussed in more detail below) (S28), and the management system 62 returns the process to Step S14, and the environment control system 10 continues to operate with the implemented change.

The interface 60 (FIG. 1) has a user accessible switch 140 that sets the maximum total operating power consumption (110, FIG. 3) to one of a plurality of levels by setting one or more of the maximum current draw of the variable-speed compressor 18, the maximum rotational speed of the variable-speed evaporator fan 28, and the maximum pulse-width modulation (PWM) duty cycle of the resistance heater 46.

Figure 4:
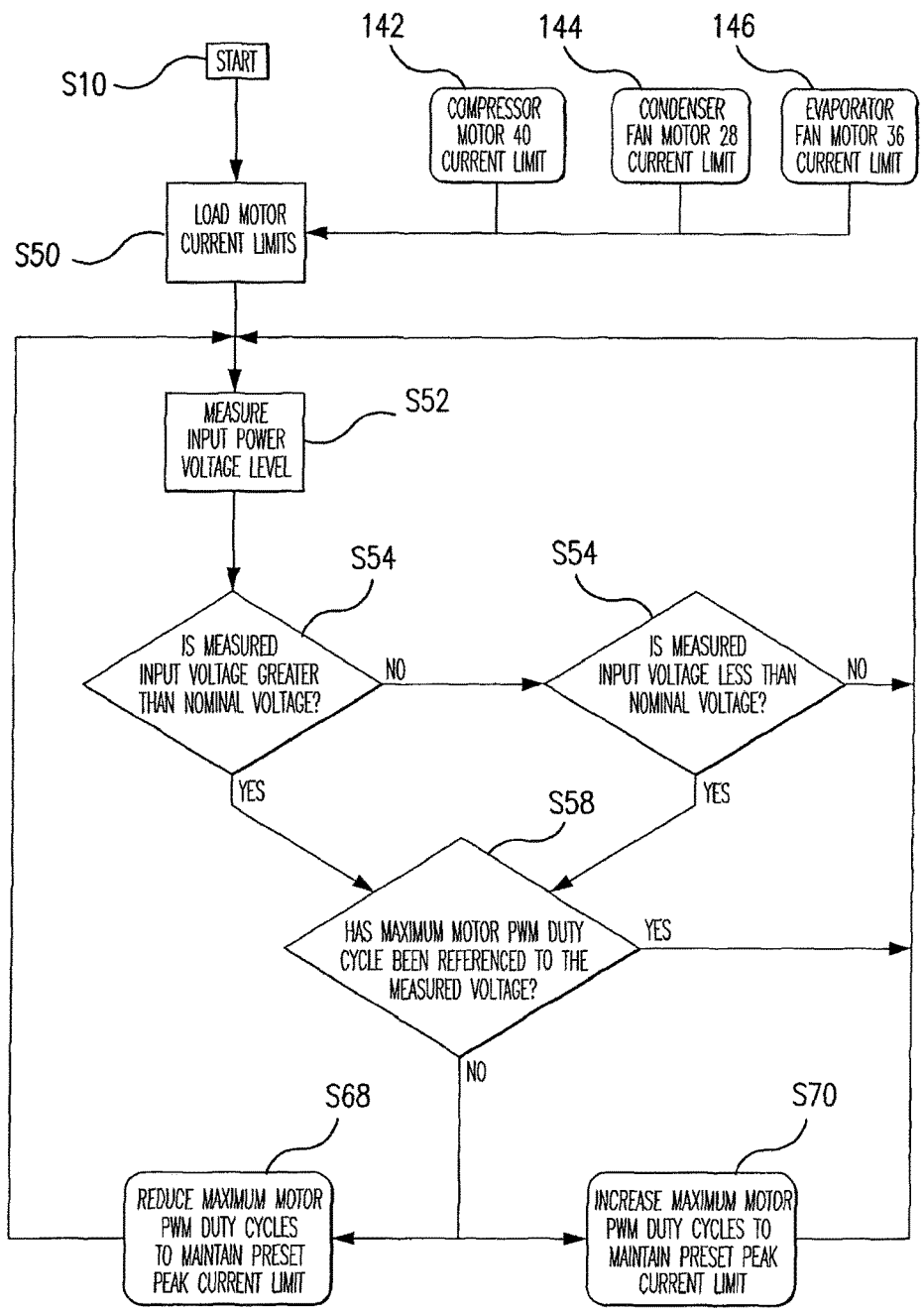
FIG. 4 is another flow chart for the process of operating the system of FIG. 1, showing how load motor currents may be maintained within operating limits.

Turning now to FIG. 4, the intelligent management system 62 automatically limits the maximum current draw and rotational speed of various components so that the devices can be safely and continuously operated at an input power voltage that varies within a range of from not more than 20% above to not less than 30% below their nominal operating voltages. Following start of operations (S10), the processor 64 loads motor current limits 142, 144, 146 into the memory device 66 (S50), Then the processor 64 measures the input power voltage level (S52), and then a determination is made as to whether the measured input voltage is greater than the nominal voltage (S54). The measured voltage is the voltage that is applied to the respective motor 28, 36, 40. If NO, then a determination is made as to whether the measured input voltage is less than the nominal voltage (S56). If YES from Step S54 (i.e., if a measured input voltage is greater than the nominal voltage), then the processor 64 makes a determination as to whether the maximum motor PWM duty cycle has been referenced to the measured voltage (S58).

If NO from Step S56 (i.e., if the processor 64 determines that a measured input voltage is not less than the nominal voltage), then the process return to Step S52, If YES from Step S56 (i.e., if the processor 64 determines that a measured input voltage is less than the nominal voltage), then the process moves to the determination at Step S58. If NO from Step S58 (i.e., if the maximum motor PWM duty cycle has not been referenced to the measured voltage), then the maximum motor PWM duty cycles are reduced to maintain the present peak current limit (S68), if the determination is YES at Step S54. On the other hand, the maximum motor PWM duty cycles are increased to maintain the present peak current limit (S70), if the determinations are NO at Step S54, YES at Step S56, and NO at Step S58. After Steps S68, S70, the process returns to Step S52 and the environment control system 10 continues to operate. By providing the YES path from Step S58, the environment control system 10 can continue to operate (S52) and does not have to make any change with respect to the maximum motor PWM duty cycle (i.e., Steps S68, S70 can be bypassed) in the event the maximum motor PWM duty cycle is already within a desired range relative to the measured input voltage.

In the illustrated embodiment, the refrigerant gas has a low critical temperature and/or a low critical pressure, and the intelligent management system 62 adjusts one or more operational parameters, including the condenser fan speed, the evaporator fan speed, and the compressor speed, to ensure that the HVAC unit 10 operates below the critical temperature and/or pressure. In addition, the intelligent management system 62 may be configured to dynamically adjust the evaporator superheat to maintain the compressor inlet and/or discharge gas temperatures within predetermined safe operational limits. If desired, the extent to which the expansion valve 20 is open may be electronically adjustable.

Figure 5:
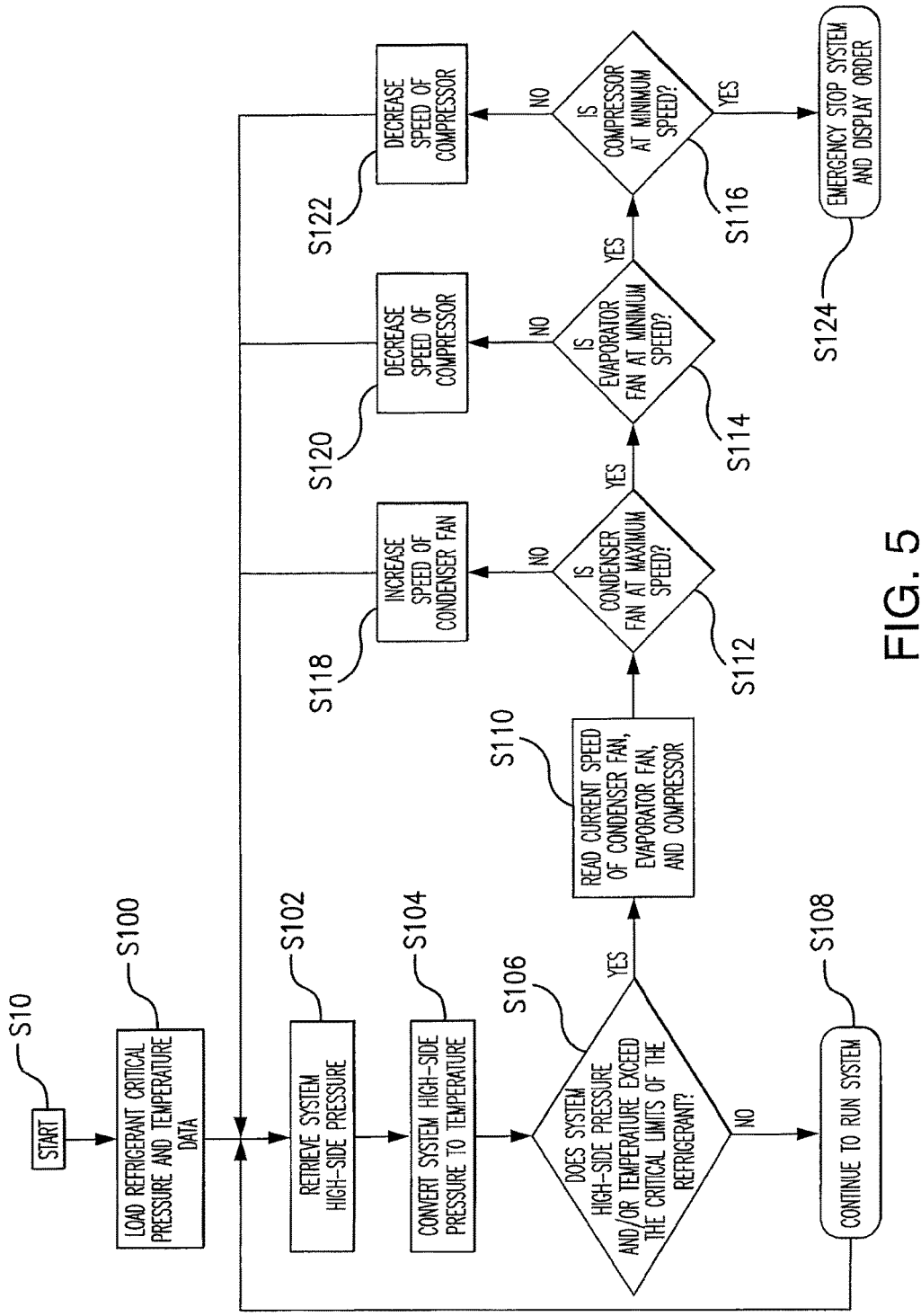
FIG. 5 is another flow chart for the process of operating the system of FIG. 1, showing how high-side pressure and temperature may be prevented from exceeding limits.

As illustrated in FIG. 5, following start of operations S10, the processor 64 loads refrigerant critical pressure and temperature data into the memory device 66 (S100). Then the management system 62 retrieves a measured value of the high-side pressure from the first pressure monitor 82 (FIG. 1) (S102, FIG. 5), converts the measured high-side pressure (82) to a temperature (S104), and then makes a determination as to whether the system high-side pressure and/or temperature exceed the critical limits of the refrigerant (S106). If NO, the process continues to Step S102 and the environment control system 10 continues to operate (S108).

However, if YES from Step S106 (i.e., if the high-side temperature does exceed the critical limit of the refrigerant), then the management system 62 reads the current speeds of the condenser fan 26, the evaporator fan 34, and the compressor 18 (S110). Subsequently, the processor 64 makes one or more determinations, in turn, as to whether the condenser fan 26, the evaporator fan 34, and the compressor 18 are at their maximum, minimum and minimum speeds, respectively (S112, S114, S116). If the condenser fan 26 is determined to be not at its maximum speed (NO from S112), then the speed of the condenser fan 26 is increased (S118), to reduce the heat of the refrigerant in the condenser 14, and thereby reduce the high-side pressure (Pd) and/or temperature immediately downstream from the compressor 18.

If the condenser fan 26 is determined to be at its maximum speed (YES from S112), and if the evaporator fan 34 is determined to be operating at greater than its minimum speed (NO from S114), then the speed of the compressor 18 is decreased (S120), to thereby reduce the high-side pressure (Pd) and/or temperature immediately downstream from the compressor 18. On the other hand, if the evaporator fan 34 is determined to be operating at its minimum speed (YES from S114), then the speed of the compressor 18 is decreased if possible (S122, via NO from S116) or, if the speed of the compressor 18 cannot be further decreased (YES from S116), then the HVAC unit 10 is stopped on an emergency basis and an error message is displayed on the user interface 60 (S124).

Figure 6:
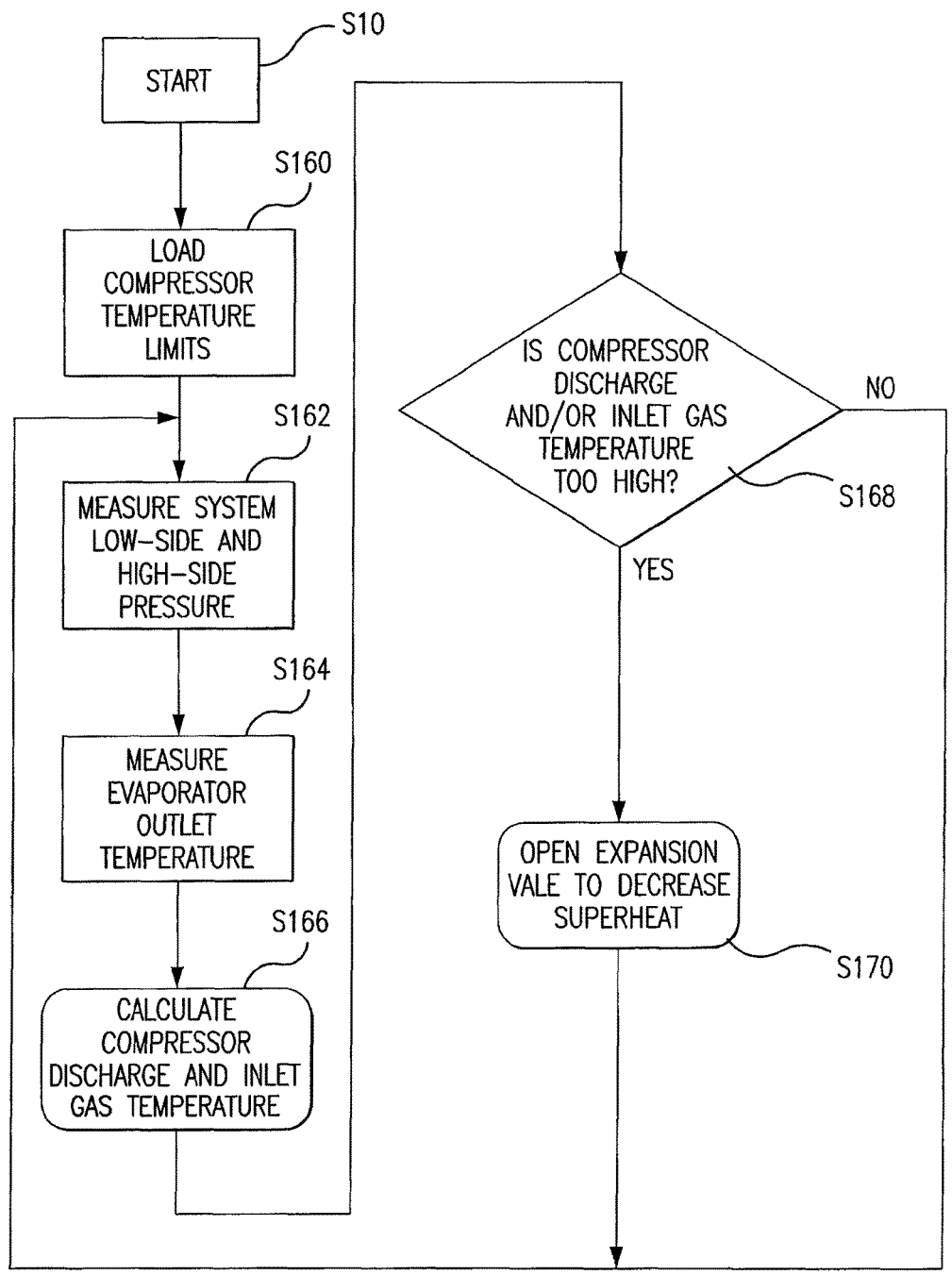
FIG. 6 is another flow chart for the process of operating the system of FIG. 1, showing how an expansion valve can be selectively adjusted to prevent a compressor temperature from exceeding an operational limit.

Another way in which the system 10 can maintain the compressor inlet (84) and the discharge (82) gas temperatures within predetermined safe operating limits is illustrated in FIG. 6. Following start of operations (S10), the processor 64 loads compressor temperature limits into the memory device 66 (S160). Then the processor 64 reads measured values of the low-side and high-side pressures from the second and first pressure monitors 84, 82, respectively (S162), and the processor 64 reads a measured value of the evaporator outlet temperature from the corresponding temperature sensor 74 (S164).

Then the processor 64 calculates the compressor discharge and inlet gas temperatures (S166), and makes a determination as to whether the compressor discharge and/or inlet temperature is too high (S168). If NO, the process returns to Step S162, and the environment control system 10 continues to operate. If YES (i.e., if the compressor discharge and/or inlet temperature is too high), then the extent to which the expansion valve 20 is open is increased (by controller 42) to decrease the superheat (S170), the process returns to Step S162, and the environment control system 10 continues to operate.

According to a preferred embodiment, the evaporator fan motor 36, the condenser fan motor 28, and the compressor motor 40 are permanent magnet-type motors. The intelligent management system 62 may be configured to restrict the maximum acceleration rate of the variable-speed motors 36, 28, 40 to prevent respective current draws above predetermined maximum safe levels. In addition, the maximum deceleration rate of the permanent magnet motors 36, 28, 40 may be restricted to prevent the buildup of excessive voltage in the environment control system 10.

Moreover, the intelligent management system 62 may be configured to restrict the maximum acceleration rate of the compressor motor 40 to prevent temporary loss of lubrication within the compressor 18. For example, as part of a compressor startup sequence, the compressor motor 40 may be held at a predetermined speed for a predetermined period of time to ensure that the compressor 18 has proper lubrication. After an initial period of time, during which pressure equalization occurs, the speed of the compressor motor 40 may be linearly increased and then held at a constant predetermined speed for a period of time sufficient to avoid loss of lubrication in the compressor, after which the compressor 18 may be operated at target speeds according to performance requirements, as determined by the intelligent management system 62.

In the illustrated embodiment, air 98 (FIG. 1) returning from the portable shelter 80 (FIG. 2) is recycled through the evaporator 16 (FIG. 1) by way of a suction conduit 100. The environment control system 10 may have an electronically controllable fresh air vent 102 for mixing fresh air 22 into the air 98 that is recycled from the shelter 80 through the suction conduit 100. A motorized controller 104 is used to move the vent 102 to a fully closed position, a fully open position, and intermediate positions between the fully open and fully closed positions. When the vent 102 is in the fully closed position, essentially no fresh air 22 is mixed with the recycled air 98. When the vent 102 is in the fully open position, a large amount of fresh air 22 is mixed into the recycled air 98 to flow through or over the evaporator 16. When the vent 102 is in one of the intermediate positions, some fresh air 22 flows through the evaporator 16, though not as much as when the vent 102 is in the fully open position.

An air quality sensor 110 may be located within the air stream 76 circulated by the evaporator fan 34. The sensor 110 can monitor the circulating air 76 to determine the presence and/or concentration level of one or more contaminants, including, among other things, the concentration of carbon dioxide.

In the illustrated embodiment, the environment control system 10 operates in two modes, that is, a first, adjustable vent mode and a second, closed vent mode. The first mode is an active mode in which the position of the fresh air vent 102 (i.e., the extent to which the vent 102 is open) is adjusted by the management system 62 to ensure that the level of contaminants within the circulating air 76, as measured by the air quality sensor 110, does not exceed a first predefined maximum. The second mode is an inactive mode in which the vent 102 remains fully closed regardless of the level of contamination measured by the air quality sensor 110.

Whether the environment control system 110 is operated in the first or second mode may be user selectable (via the user interface 60). The first mode may be used, for example, when the shelter 80 is occupied by humans, especially patients, who may be especially sensitive to the level of contamination. The second mode may be used when the shelter 80 is first set up and not yet occupied, or when the shelter 80 is used to store inanimate objects, and not persons or animals that are sensitive to the level of contamination in the interior air 76.

Further, the illustrated system 10 may be operated in a third mode, wherein, when the user selectable mode of fresh air vent operation is active, the rotational speed of the compressor 18 is monitored by the intelligent management system 62 and, upon the compressor speed exceeding a predefined threshold, the predefined maximum level of contamination within the circulating air 76 is increased from the first level to a second, higher predefined maximum level. The third mode may be especially useful where the first maximum level of concentration is preferred for comfort or other factors but the second maximum level of contamination may be acceptable and/or tolerated by the occupants or items stored in the shelter 80 under certain conditions, including conditions that would otherwise require operation of the compressor 18 outside the safe operating limits of the compressor 18.

The illustrated environment control system 10 has a relative humidity sensor 112 located in the air stream 30 ahead of (upstream from) the evaporator 16. The processor 64 may respond to signals (145) from the relative humidity sensor 112 to adjust the speed of the compressor 18 to thereby increase or decrease the amount of dehumidification of the circulating air 76 by modifying the target evaporator temperature.

Figure 7:
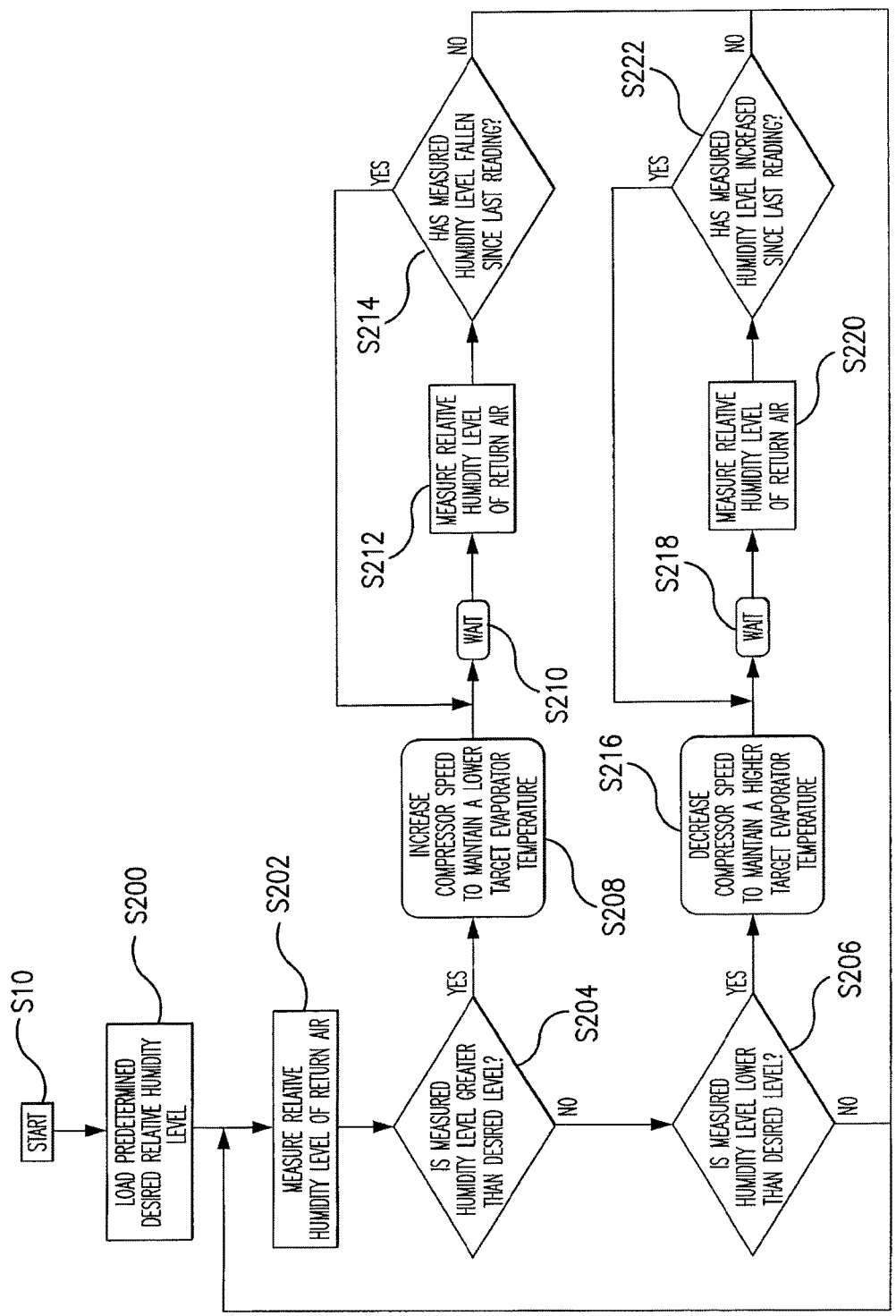
FIG. 7 is another flow chart for the process of operating the environment control system of FIG. 1, showing how a relative humidity level can be maintained at a desired level.

As illustrated in FIG. 7, following start of operations (S10), the processor 64 loads a predetermined relative humidity level into the memory device 66, and then the processor 64 reads the relative humidity level of the return air 98 from the corresponding sensor 112 (S202). The processor 64 then determines whether the measured humidity level is greater than the desired level (S204). If NO, the processor 64 determines whether the measured humidity level is less than the desired level (S206). If Yes from Step S204 (i.e., if it is determined that the measured humidity level is greater than the desired level), then the speed of the compressor 18 is increased (by applying a suitable signal to the compressor motor 40) to maintain a lower target evaporator temperature (S208), then the system 10 waits a predetermined amount of time (S210), and then the system 10 measures the relative humidity level of the return air 98 again, using the sensor 112 (S212).

The processor 62 then determines whether the measured humidity level has fallen since the last reading (S214). If NO, the humidity-related effect of increasing the compressor speed may be understood to have been stabilized, and the process return to Step S202, and the environment control system 10 continues to operate. If Yes from Step S214, the system 10 waits again (S210) and then takes another measurement of relative humidity (S212) to determine whether the humidity level within the returning air 98 has stabilized (S214).

If YES from Step S206 (i.e., if the measured humidity level is determined to be less than the desired level), then the speed of the compressor 18 is decreased to maintain a higher target evaporator temperature (S216), and then the system 10 iteratively (YES from S222) waits (S218) and then measures the relative humidity (S220) again, until the humidity-related effect of decreasing the compressor speed stabilizes (NO from S222), at which point the process returns to Step S202, and the environment control system 10 continues to operate.

Figure 2:
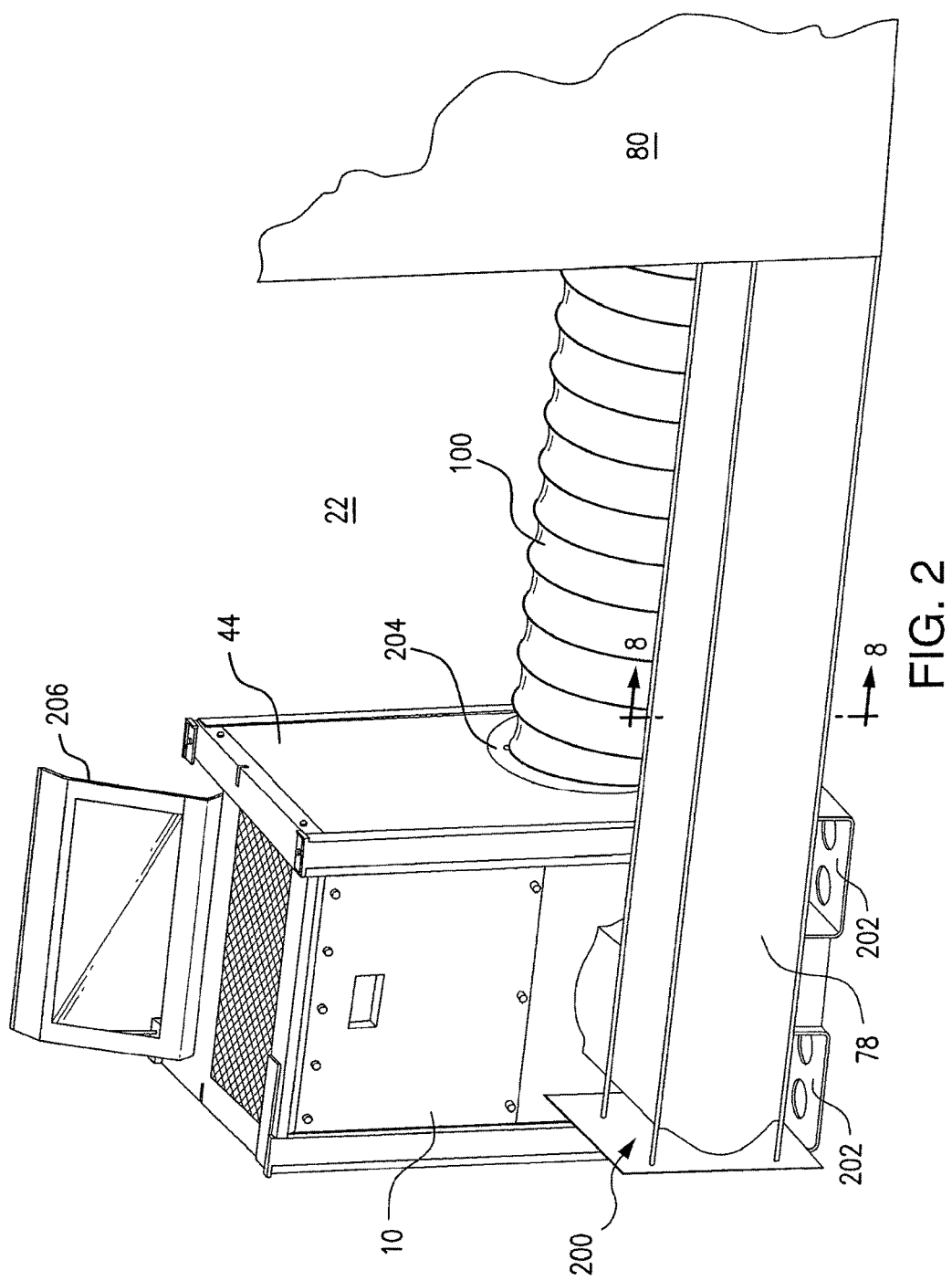
FIG. 2 is a perspective view of a portable shelter connected to the environment control system of FIG. 1 by flexible conduits.

As illustrated in FIG. 2, the environmental control system 10 may be in the form of a HVAC unit that has a first opening 200 through the enclosure 44 for receiving the discharge duct 78 and a second opening 204 for receiving the suction conduit 100. The other ends of the discharge duct 78 and the suction conduit 100 are attached to respective openings in the fabric shelter 80. The exterior enclosure 44 for the HVAC unit 10 may have sufficient rigidity to safely and securely support the weight of at least three like HVAC units 10 stacked vertically on top of each other. Each unit 10 may be provided with pockets 202 for accepting the forks of an industrial lift truck, and one or more concave and/or convex pockets may be located at the top and the bottom to aid in centering the stacked units 10 for storage or transport. If desired, a weatherproof cover 206 may be used to cover the user interface 60 (FIG. 1).

Figure 8:
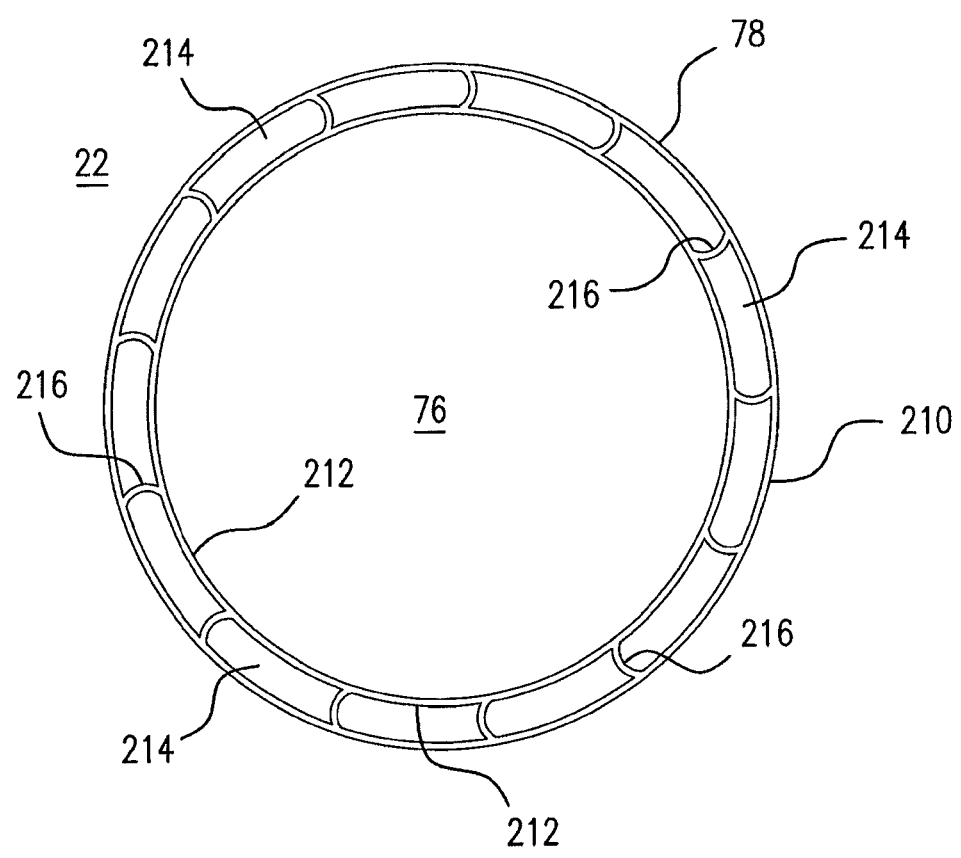
FIG. 8 is a cross sectional view of one of the flexible ducts shown in FIG. 2, taken along the line 8-8 of FIG. 2.

The duct 78 (FIG. 8) for discharging the conditioned air 76 into the shelter 80 may be inflated by the pressure of the discharged air 76 (and by no other source of pressure or inflation). The duct 78 has an outer wall 210 formed of a flexible, lightweight and gas impermeable material, and a flexible inner wall 212. The inner wall 212 has limited porosity to permit air 76 inside the duct 78 to pass into the annulus 214 between the inner and outer walls 212, 210. Baffles 216 are located within the annulus 214 to prevent the air that has entered the annulus 214 (by passing through the inner layer 212) from actively circulating within the annulus 214. As a result, the air within the annulus 214 becomes stagnant and thereby provides thermal insulation between the air 76 flowing inside the duct 78 and the external environment 22.

According to another aspect of the present disclosure, the heating, ventilating and air conditioning system 10 may be configured to operate in a standard mode and a protective mode. The standard mode may be selected (via the interface 60) where external (environmental) conditions are expected to be such that the maximum operating current, temperature and/or pressure limits of any one or more of the system components 28, 36, 110, 84, 40, 82 will likely not be exceeded. The processor 64 may be configured to automatically switch the system 10 to the protective mode of operation where the external conditions are such that one or more of the system components likely would exceed its design specification if the system 10 remained in the standard mode.

Moreover, the system 10 may be configured to switch from standard operating mode to protective operating mode based on the temperature of the condenser inlet air 22, the evaporator inlet air 30, or both. Moreover, the system 10 may be configured to switch from the standard operating mode to the protective operating mode based on the one or more of the system low-side pressure (Ps, 84), the system high-side pressure (Pd, 82), the compressor current draw, the compressor rotational speed, the evaporator fan rotational speed, and the condenser fan rotational speed, as communicated through the corresponding signal lines, receivers or transmitters 145.

Thus, the intelligent management system 62 may reduce the speed of the compressor 18 when operating in the protective mode to a level below the speed that would otherwise be set if operating in standard mode. Likewise, the speed of the condenser fan 26 may be increased in the protective mode to a level above the speed that would otherwise be set for it if the system 10 were operating in standard mode, and the speed of the evaporator fan 36 may be set in the protective mode to a level below the speed to which it would be set in the standard mode.

According to a preferred embodiment, the heating, ventilating and air conditioning system 10, employing the intelligent management system 62, sets the compressor rotational speed at the speed necessary to achieve a predefined target evaporation temperature when operating in the standard mode. The illustrated system 62 is likewise configured to measure the power consumption of the compressor 18 and the power consumption of the condenser fan motor 28, and to adjust the speed of the condenser fan 26 to provide the lowest total power consumption, when operating in the standard mode.

If desired, the interface 60 may include a permanently affixed sunlight-readable user interface panel, for controlling the system 10 and for displaying operational data. According to another embodiment, the interface 60 may include a detachable device that allows a user/operator to fully or partially control the system 10 even while the user/operator is located more than five feet away from the system 10. A dual-function data transfer port (not shown) may be employed to allow a computer to transfer data to and from the remote user interface for operator-system control across a distance of more than five feet. This, way, the environment control system 10 may be operated by a person located within the fabric shelter 80.

The invention is not limited to the structures, methods and instrumentalities described above and shown in the drawings. The invention is defined by the claims set forth below.

What is claimed and desired to be protected by Letters Patent of the United States is:

1. An environment control system for supplying conditioned air to a portable shelter, the control system comprising:
   a refrigerant condenser, a condenser fan for moving air over the refrigerant condenser, and a variable-speed motor for operating the condenser fan;
   an evaporator, an evaporator fan for moving air over the evaporator and into the portable shelter, and a variable-speed motor for operating the evaporator fan;
   a compressor for receiving refrigerant from the evaporator and for transferring the refrigerant to the condenser; and
   a management system including a memory device and a processor, the memory device being configured to store operating limits, and wherein the processor is configured to make determinations based on (1) the operating limits and (2) measured parameters, and to adjust one or more of the speed of the condenser fan, the speed of the evaporator fan, and the speed of the compressor in response to the determinations, to thereby optimize performance of the environment control system within the operating limits; and
   wherein the environment control system includes an adjustable fresh air vent for allowing fresh air into the control system, and an air quality sensor for sensing a contamination level, and wherein the management system is configured to operate the control system in active and inactive modes, wherein the management system adjusts the fresh air vent in response to a signal from the air quality sensor to maintain the contamination level below a first threshold, in the active mode, and wherein the fresh air vent is closed regardless of the contamination level, in the inactive mode.

2. The control system of claim 1, wherein the management system is configured to adjust the condenser fan speed, the evaporator fan speed, and the compressor speed to maintain the refrigerant below a critical pressure or temperature.

3. The control system of claim 1, further comprising an adjustable expansion valve located between the condenser and the evaporator, and wherein the management system is configured to adjust the expansion valve to maintain temperatures at inlet and outlet sides of the compressor within safe limits.

4. The control system of claim 1, further comprising a relative humidity sensor located upstream from the evaporator, and wherein the management system is configured to adjust the compressor speed in response to a signal from the relative humidity sensor, to thereby adjust the humidity of air within the shelter.

5. The control system of claim 1, further comprising an electric resistance heater for heating air that is discharged into the shelter.

6. The control system of claim 5, wherein the management system is configured to prevent total operating power consumption of the control system, current draw of the variable-speed compressor motor, the evaporator fan speed, and a PWM duty cycle of the electric resistance heater from exceeding maximum levels.

* * * * *